Jan. 16, 1962   P. H. HARRER ET AL   3,016,675
CROP HANDLING MACHINE
Filed Sept. 3, 1958   3 Sheets-Sheet 1

Inventors
Paul H. Harrer
William H. Shannon
by
Attorney

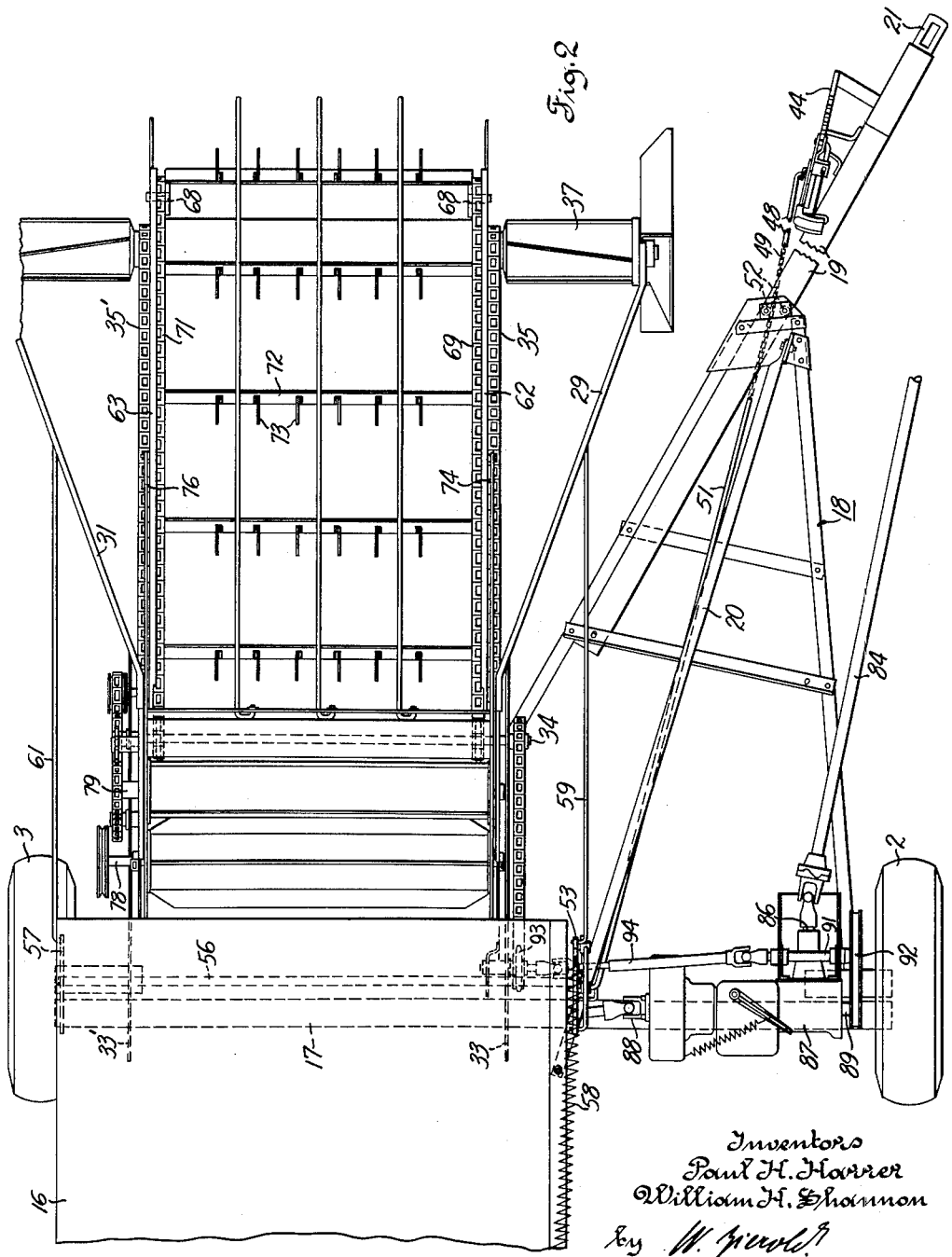

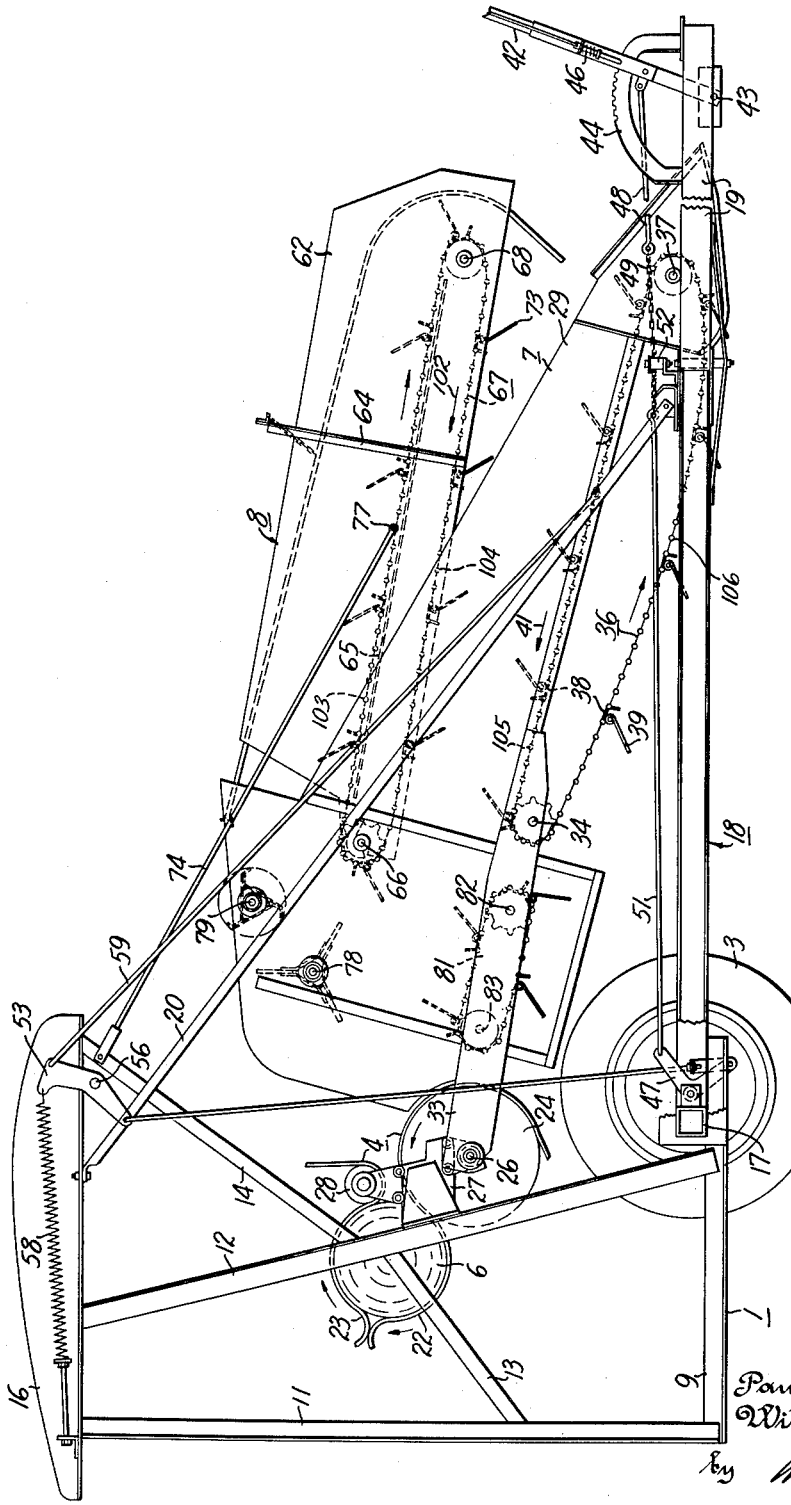

3,016,675
CROP HANDLING MACHINE
Paul H. Harrer and William H. Shannon, La Porte, Ind., assignors to Allis-Chalmers Manufacturing Company, Milwaukee, Wis.
Filed Sept. 3, 1958, Ser. No. 758,768
4 Claims. (Cl. 56—341)

The invention relates to agricultural machines such as harvester threshers, hay balers and forage harvesters, which are used for gathering and processing crops in the field.

One of the problems which are usually encountered in the operation of this kind of machine is the proper feeding of crop material to the processing apparatus, particularly when the material is in the form of a light and fluffy windrow of straw or hay. Spring fingers or tines which are usually employed to pick up the material from the ground and to feed it upwardly and rearwardly to the processing apparatus may merely dig into such material and stir it up rather than imparting a positive feeding movement to it. If the volume, texture and density of the material are such that it cannot be handled properly by conventional feeding mechanisms, continued advance movement of the machine will cause an undue accumulation of material on the forward part or ahead of the feeding mechanism, with the result that the machine must be stopped for clearing the feed mechanism of the excess of material.

Generally, it is an object of the invention to provide a crop handling machine including a crop processing apparatus and an improved feeding mechanism therefor which will take care of the hereinabove mentioned feeding difficulties in a practical and entirely satisfactory manner.

More specifically, it is an object of the invention to provide an improved crop handling machine of the hereinabove outlined character which is equipped with an up and down adjustable pickup conveyer and with an auxiliary conveyer for temporarily assisting the pickup conveyer in feeding material rearwardly and upwardly to the crop processing apparatus.

A further object of the invention is to provide an improved crop handling machine of the hereinabove outlined character in which the pickup conveyer is adjustable up and down in conventional manner to raise and lower its forward end, and in which the auxiliary conveyer becomes automatically effective to assist rearward feeding of crop material by the pickup conveyer when the latter is adjusted to raise its front end from the ground.

These and other objects and advantages are attained by the present invention, various novel features of which will be apparent from the description herein and the accompanying drawings disclosing an embodiment of the invention, and will be more particularly pointed out in the appended claims.

Referring to the drawings:

FIG. 2 is a schematic top view of the machine shown in FIG. 1; and

FIG. 3 is a view similar to FIG. 1, but showing the pickup mechanism in a different condition of adjustment.

Figure 1:
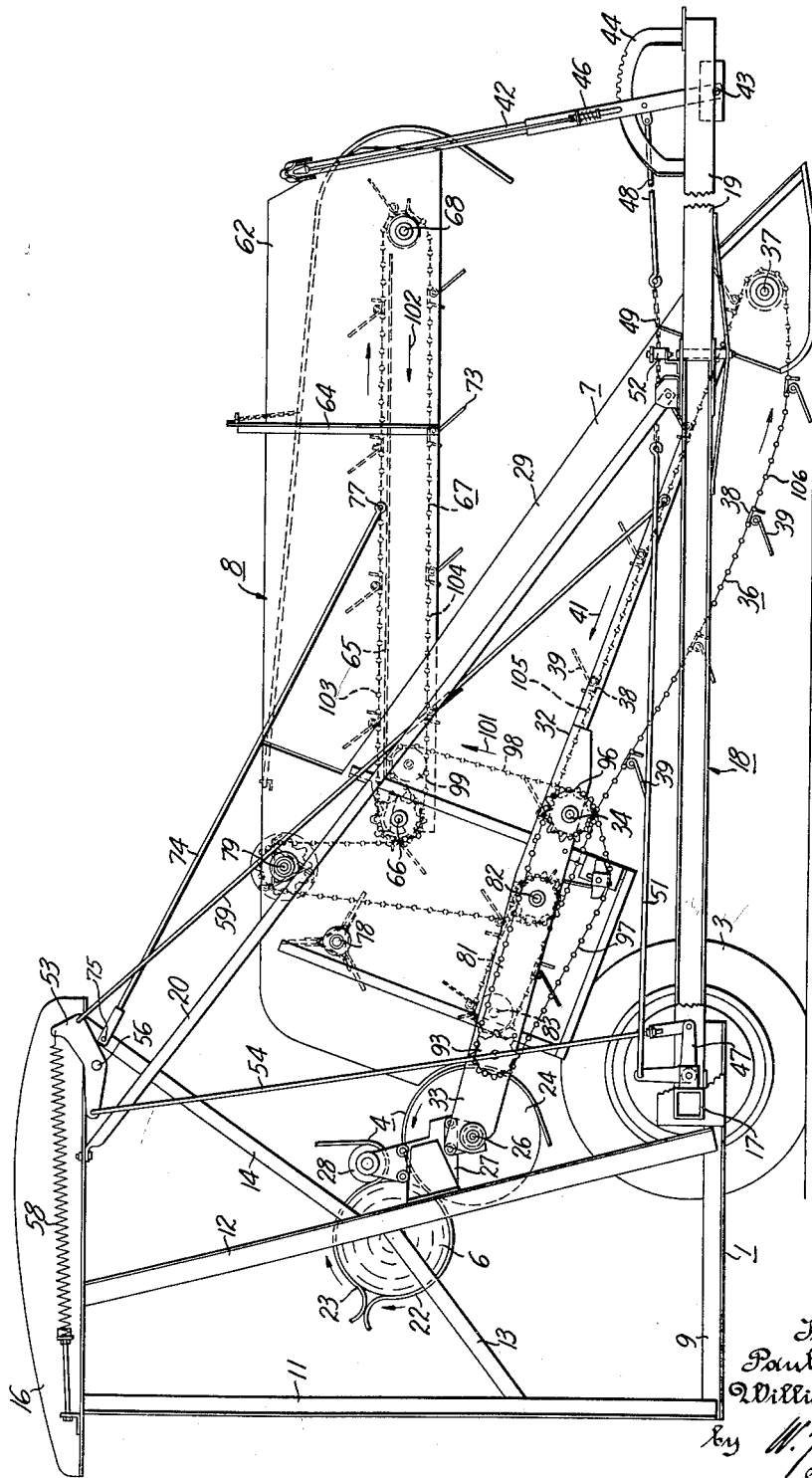
FIG. 1 is a schematic side view of a machine for gathering and forming crop material into cylindrical bales, details of the bale forming apparatus being omitted because well known in the art.

The principal components of the machine shown in the drawings are a mobile support comprising a main frame 1 and ground wheels 2 and 3; crop processing apparatus generally indicated by the reference character 4 and operable to form crop material such as hay or straw into a cylindrical bale 6; a pickup mechanism generally indicated by the reference character 7; and an auxiliary conveying mechanism generally indicated by the reference character 8.

The main frame 1 of the machine comprises an assembly of structural members including, at each side of the machine, a horizontal beam 9, a vertical rear post 11, a rearwardly and upwardly slanting post 12, braces 13 and 14 extending rearwardly and forwardly, respectively, from the post 12, and a deck structure 16. The wheels 2 and 3 are rotatably mounted at opposite ends of an axle structure 17 which is rigidly connected with the side beams 9. As shown in FIG. 2, a triangular draft structure 18 extends forwardly from the axle structure 17 at the right side of the machine and is connected at its rear end with the axle structure 17 in conventional manner. A brace 20 extends between the deck structure 16 and a forward portion of the draft structure 18 in order to secure the draft structure rigidly to the main frame of the machine.

The draft structure 18 includes a forwardly and laterally extending draft pole 19 which is equipped at its forward end with a suitable coupling device 21 for connection to a tractor drawbar (not shown) in conventional manner.

The bale forming mechanism 4, which is indicated in FIG. 1 by only a few of its component parts, is of the well known type which operates to roll a mat of hay or the like into a cylindrical bale 6. For a detailed explanation of the mechanism 4, reference may be had to U.S. Patent No. 2,336,491, December 14, 1943, U. F. Leubben, Rotary Baler. Briefly, the bale 6 is formed in a rolling chamber defined by a set of lower belts 22 and a set of upper belts 23. The lower belts 22 are passed around a lower drive roll 24 which is carried by means of a shaft 26 and brackets 27 (only one shown) on the posts 12 of the main frame 1. The upper belts 23 are passed around on upper drive roll 28 which is also mounted on the brackets 27. The gap between the upper and lower drive rolls affords an inlet passage to the bale rolling chamber, and the directions in which the belts 22 and 23 are driven are indicated by the arrows in FIG. 1. When the machine is operated in the field, material is picked up from the ground and delivered to the gap between the drive rolls 24 and 28 by the pickup conveyer 7 as will be explained more fully hereinbelow. The incoming material passes into the bale forming chamber between the belts 22 and 23, and when the bale has reached a predetermined diameter the bale forming chamber is opened up and the bale is discharged, all in conformity with well known principles of construction and operation.

The pickup mechanism 7 comprises a rigid, generally trough-shaped frame structure including an upright wall assembly 29 at the right side of the machine, a corresponding wall assembly 31 (FIG. 2) at the left side of the machine and a transverse bottom structure 32 between the side wall structures 29 and 31. The transverse bottom structure 32 includes a pair of rearwardly extending arms in straddling relation to the lower drive roll 24, one of these arms being indicated in FIG. 1 by the reference character 33. The arm 33 at the right side of the machine and the corresponding arm 33' at the left side of the machine are pivotally connected with the main frame 1 on the axis of the shaft 26 which will be referred to as a first horizontal transverse axis. A pickup conveyer drive shaft 34 is rotatably mounted on the bottom structure 32 of the pickup conveyer frame 1 a substantial forward distance from the first horizontal transverse pivot axis of the pickup conveyer. A first endless belt type conveying element 36 having an upper stretch 105 and a lower stretch 106 is operatively connected with the pickup conveyer drive shaft 34 and extends between the latter and a forward roll and shaft assembly 37 which is rotatably mounted on the bottom structure 32 between the side wall structures 29 and 31 of the pickup conveyer frame. The conveying element 36 is of the usual raddle type comprising a pair of side chains 35, 35' (FIG. 2) which are looped around sprockets (not shown) on the shaft 34 and a series of cross slats 38 between the side chains. Spring fingers 39 are mounted on the cross slats 38 in conformity with established practice, and the direction in which the conveying element 36 is driven in operation of the machine is indicated by the arrow 41.

Up and down adjustment of the pickup conveyer 7 about the axis of shaft 26 is effected by means of a manually operable mechanism of conventional construction, including a hand lever 42 within reach of an operator on the tractor (not shown) drawing the machine. The hand lever 42 is pivoted at 43 on the draft pole 19 and may be locked in different positions of adjustment by means of a quadrant 44 and a detent mechanism 46. Back and forth adjustment of the lever 42 is transmitted to a bell crank lever 47 on the axle structure 17 by means of a flexible connection comprising a forward reach rod 48, a chain 49 and a rearward reach rod 51. The chain 49 extends between a pair of guide rollers 52 (FIG. 2) on the draft structure 18, and the rod 51 is pivotally connected at its rear end to an upstanding arm of the bell crank lever 47. A forwardly extending arm of the bell crank lever is connected to a rocker 53 at the upper part of the main frame 1 by means of an up and down movable rod 54. The rocker 53 is secured to a cross shaft 56 which is rotatably mounted on the main frame 1 of the machine, and another rocker 57 (FIG. 2) is rigidly secured to the cross shaft 56 at the left side of the machine. A counterbalancing spring 58 is connected with the rocker 53 and anchored on the main frame for biasing the shaft 56 in anticlockwise direction as viewed in FIG. 1. The rockers 53 and 57 are connected in lift force transmitting relation with the pickup conveyer frame by means of rods 59 and 61, the rod 59 extending between the rocker 53 and a forward portion of the conveyer side wall 29 and the rod 61 extending similarly between the rocker 57 and a forward portion of the conveyer side wall 31.

In the condition of the machine as illustrated in FIG. 1, the hand lever 42 is adjusted to its rearmost position and the link and lever system 47 to 61 which connects the lever 42 wtih pickup conveyer frame 29, 31, 32 is so proportioned that the forward end of the pickup conveyer frame rides on the ground, as shown in FIG. 1 when the hand lever 42 is adjusted to its rearmost position.

FIG. 3 shows the pickup conveyer in a raised position to which it may be adjusted by forward movement of the hand lever 42 from the rearward position in which it is shown in FIG. 1. Such raising movement of the pickup conveyer is assisted by the counterbalancing spring 58 and causes swinging movement of the entire pickup conveyer relative to the main frame 1 and the draft structure 18 about the axis of the lower drive roll shaft 26.

The auxiliary conveying mechanism 8 comprises a generally trough shaped frame structure including a pair of upright side walls 62 and 63 (FIG. 2), an arched cross connection 64 and a bottom wall 65 between the side walls. The transverse spacing of the side walls 62 and 63 from each other is somewhat shorter than the space between parallel rearward portions of the pickup conveyer side walls 29 and 31, and the auxiliary conveyer frame is pivotally mounted at its rear end in the space between the parallel rearward side wall portions of the pickup conveyer frame by means of an auxiliary conveyer drive shaft 66. The shaft 66 presents a second horizontal transverse axis which is spaced forwardly from the first horizontal transverse axis of the shaft 26 and located generally above the drive shaft 34 of the pickup conveyer.

An endless belt type conveying element 67 is looped at its rear end around the shaft 66 in the space between the auxiliary conveyer side walls 62 and 63, and at its forward end the conveying element 67 is looped around a pair of idlers 68 (FIG. 2) which are rotatably mounted on forward portions of the side walls 62 and 63, respectively, in facing, coaxial relation to each other. The upper stretch 103 of the auxiliary conveying element 67 is sustained on the bottom wall 65 of the auxiliary conveyer frame. Like the endless conveying element 36 of the pickup conveyer, the conveying element 67 of the auxiliary conveyer is of the raddle type and comprises side chains 69 and 71 (FIG. 2) and a series of cross slats 72. Spring fingers 73 are mounted on the cross slats 72 to assist movement of material by the auxiliary conveyer as will be explained more fully hereinbelow.

The pivotally adjusted position of the auxiliary conveyer frame about the axis of the shaft 66 is controlled by suspension means in the form of two rods 74 and 76 which extend between upper portions of the main frame 1 and portions of the auxiliary conveyer frame forwardly of the shaft 66. As shown in FIG. 1, the rod 74 is pivotally connected by a pin 75 at its rear end to the main frame brace 14 at the right side of the machine and the forward end of the rod 74 is pivotally connected at 77 to the side wall 62 of the auxiliary conveyer frame. The rod 76 at the left side of the machine is similarly connected at its rear end to a main frame brace corresponding to the main frame brace 14, and the forward end of the rod 76 is pivotally connected to the auxiliary conveyer side wall 63 in axial alignment with the pivotal connection 77 at the right side of the machine.

In addition to the shaft 66, beater shafts 78 and 79 are mounted on the pickup conveyer frame in the space between the parallel rearward portions of the side walls 29 and 31, and suitable bearings (not shown) for supporting the shafts 66, 78 and 79 are mounted on these side wall portions of the pickup conveyer frame. The pickup conveyer frame also mounts a relatively short endless conveyer section 81 including a sprocket shaft 82 and a rearward idler shaft 83. The short conveyer section 81 is swingable up and down about the axis of the shaft 82 by a suitable mechanism (not shown) for controlling the passage of crop material from the endless conveying element 36 to the inlet passage of the bale rolling chamber between the drive rolls 24 and 28. In the condition of the machine as shown in FIG. 1, the short conveyer section 81 is adjusted to a lowered position in which it is effective to advance material rearwardly toward the bale rolling chamber. During a certain phase of the operating cycle of the baling mechanism it is necessary to divert the crop material from the bale rolling chamber and this may be accomplished by upward tilting movement of the short conveyer section 81 about the axis of the shaft 82. In its upwardly tilted position (not shown) the conveyer section 81 is effective, in conjunction with the beaters on shafts 78 and 79, to deliver the crop material from the rear end of the conveying element 36 to the upper stretch of the auxiliary conveying element 67 at the rear end of the latter. The auxiliary conveying element is driven in such a direction that crop material delivered to it in the described manner will be conveyed forwardly along the upper side of the wall 65 and then dropped upon the upper stretch 105 of the pickup conveying element 36 at the forward end of the latter.

The herein described control of the crop material by means of the conveyer section 81 and its return to the pickup conveyer are not part of the present invention and a more detailed description thereof is therefore believed unnecessary.

Power transmitting means for driving the pickup and auxiliary conveyers are connected to a power takeoff shaft on the propelling tractor and constructed as follows.

Referring to FIG. 2, a line shaft 84 which has a conventional driving connection (not shown) with a tractor power take-off shaft is universally connected to the input shaft 86 of a transmission mechanism 87. A first output shaft 88 of the transmission mechanism 87 is connected by conventional mechanism (not shown) with the upper and lower drive rolls 24 and 28 of the bale forming mechanism. A second output shaft 89 of the transmission mechanism 87 is connected with an external countershaft 91 by means of a belt drive 92. The countershaft 91 drives a sprocket wheel 93 at the right side of the pickup conveyer frame by means of telescopic shafting 94 and associated universal joints. As shown in FIG. 1, the sprocket wheel 93 drives a sprocket wheel 96 on the pickup conveyer drive shaft 34 by means of a chain 97. Another drive chain 98 connects another sprocket (not shown) on the shaft 34 with corresponding sprockets on the shafts 66, 79 and 82, and an idler 99 is mounted on the side wall 29 of the pickup conveyer frame in order to place the chain 98 into proper driving engagement with the sprocket on the shaft 66.

In the operation of the machine, the chain 98 is continuously driven in the direction which is indicated by the arrow 101 in FIG. 1 and consequently, the upper stretch of the endless conveying element 36 between the shafts 34 and 37 will travel in the direction which is indicated by the arrow 41. At the same time the lower stretch 104 of the endless conveying element 67 of the auxiliary conveyer will travel in the direction which is indicated by the arrow 102 in FIG. 1.

When the pickup mechanism is adjusted to the lowered operating position in which it is shown in FIG. 1, the forward end of the pickup conveyer frame bears lightly upon the ground and while the machine advances the conveying element 36 will be driven to pick up a windrow of crop material such as hay or straw. The auxiliary conveyer element 67 will also be driven, but as long as the volume, texture and consistency of the crop material are such that the normal conveying action of the pickup conveyer will keep it moving rearwardly, the spring fingers 73 on the lower stretch 104 of the auxiliary conveyer which move rearwardly above the pickup conveyer will remain substantially out of contact with the crop material.

Should a condition of abnormal crop volume, texture or consistency be encountered under which the pickup conveyer is not able to handle the crop material properly, that is, to lift it upon the upper stretch of the pickup conveying element 36 or to move it positively to the rear, continued advance movement of the machine may cause an accumulation of excess material on the forward part of or ahead of the pickup conveying mechanism. In order to relieve the congested condition of the pickup conveyer which may result from such accumulation of excess material, it is only necessary for the operator to manually operate the lift actuating means for the pickup mechanism by temporarily pulling the lever 42 forward from the rearward position in which it is shown in FIG. 1. As a result of such forward movement of the lever 42, the pickup mechanism will be moved to a raised operating position as shown in FIG. 3. During such raising movement the pickup conveyer frame and all of the shafts mounted thereon including the upper conveyer drive shaft 66 will be moved in unison about the first horizontal axis presented by the lower roll drive shaft 26. Arcuate movement of the auxiliary conveyer drive shaft 66 in an upward direction about the shaft 26 from the position shown in FIG. 1 to the position shown in FIG. 3 decreases the radial spacing of the shaft 66 from the anchor points of the suspension rods 74 and 76 on the main frame braces 14. As a result, the forward end of the rod 74 will swing about the rearward anchor point of the rod downwardly and rearwardly from the position in which it is shown in FIG. 1, and the rod 76 at the left side of the machine will similarly swing downwardly and rearwardly about its anchor point on the main frame. FIG. 3 shows the position to which the auxiliary conveyer frame will be swung relative to the pickup conveyer frame by the mentioned upward and rearward arcuate movement of the shaft 66 about the axis of shaft 26 and by the incidental downward and rearward movement of the load transmitting structure represented by the suspension rods or hanger elements 74 and 76 about their rearward anchor points on the main frame. It will be noted that in the condition of the machine as shown in FIG. 3, the spring fingers 73 along the lower stretch of the auxiliary conveyer are much closer to the upper stretch of the pickup conveying element 36 than they are in the condition of the machine as shown in FIG. 1. The raising of the pickup conveyer frame and the simultaneous lowering of the forward end of the auxiliary conveyer frame relative to the pickup conveyer frame will bring the spring fingers 73 along the lower stretch of the auxiliary conveying element 67 within reach of excess material that may have piled upon the pickup conveyer. Since both endless conveying elements, that is, the first endless conveying element 36 of the pickup conveyer and the second endless conveying element 67 of the auxiliary conveyer are continuously driven in the directions indicated by the arrows 41 and 102, any congestion of crop material which may have occurred on the pickup conveyer will be quickly relieved by the combined rearward feeding action of the auxiliary and pickup conveyers while the machine is in the condition of adjustment as shown in FIG. 3.

When the amount of crop material which is presented to the pickup conveyer during advance movement of the machine has returned to normal, the operator may adjust the lever 42 back to its rearward position in which it is shown in FIG. 1 and normal operation of the pickup mechanism may then be resumed.

In general terms, the auxiliary conveyer frame 62 to 65 affords a mounting structure for the auxiliary endless belt type conveying element 67, which is operatively connected with the mobile support 1, 2, 3 and with the pickup mechanism so as to present a lower stretch of the auxiliary conveying element for travel lengthwise of the pickup mechanism in overlying spaced relation thereto, and so as to raise and lower said mounting structure relative to the pickup mechanism in response to lowering and raising movements, respectively, of the latter. More particularly, the mentioned operative relationship between the pickup and auxiliary conveyers is obtained by the provision of the pivot means at 66 and by the provision of load transmitting means as represented by the suspension rods 74 and 76. The latter affords an elongated load transmitting structure, and the portion of the auxiliary conveyer frame which is pivotally connected with the pickup conveyer frame at 66, and the portion of the auxiliary conveyer frame which is pivotally connected with the forward ends of the load transmitting structure 74, 76 are spaced from each other longitudinally of the auxiliary conveyer unit.

While in the foregoing a preferred embodiment of the invention has been described, it should be understood that it is not intended to limit the invention to the exact forms and details herein disclosed and that the invention includes such other forms and modifications as are embraced by the scope of the appended claims.

What is claimed is:

1. A crop handling machine comprising, in combination, a mobile support; a pickup conveyer unit pivotally connected with said support on a first horizontal transverse axis; actuating means operable to swing said pickup conveyer about said first axis selectively to raised and lowered operating positions; pivot means mounted on said pickup conveyer unit in radially spaced relation to said first axis and presenting a second horizontal transverse axis swingable in unison with said pickup conveyer unit about said first axis; an elongated load transmitting structure pivotally connected with a portion of said mobile support in spaced relation to said first axis; and an auxiliary conveyer unit having supporting connections at longitudinally spaced portions thereof with said pivot means and with said load transmitting structure, respectively, so as to present said auxiliary conveyer unit in overlying, spaced relation to said pickup conveyer unit and cause lowering movement of said auxiliary conveyer unit about said second axis in response to upward movement of said pickup conveyer unit about said first axis.

2. A crop handling machine comprising, in combination, a mobile support; a pickup conveyer frame pivotally connected with said support on a first horizontal transverse axis; a first endless belt type conveying element operatively mounted so as to present an upper and a lower stretch thereof for travel lengthwise of said pickup conveyer frame; actuating means operable to swing said pickup conveyer frame about said first axis selectively to raised and lowered operating positions; a cross shaft mounted on said pickup conveyer frame for rotation on a second horizontal axis in elevated relation to said upper stretch of said first conveying element and in radially spaced relation to said first axis; an auxiliary conveyer frame extending lengthwise of and above said upper stretch of said first conveying element and supported at its rear end on said pickup conveyer frame for up and down swinging movement of its forward end about said second axis; a second endless belt type conveying element looped around said cross shaft and around an idler structure rotatably mounted at said forward end of said auxiliary conveyer frame so as to present upper and lower stretches thereof for travel lengthwise of said auxiliary conveyer frame; an elongated load transmitting structure pivotally connected at longitudinally spaced portions thereof, respectively, with a portion of said mobile support above said first axis and with a portion of said auxiliary conveyer frame forwardly of said cross shaft; and power transmitting means operatively connected with said first and second endless belt type conveying elements for simultaneously moving said upper stretch of said first conveying element and said lower stretch of said second conveying element in a rearward direction.

3. A crop handling machine comprising, in combination, a mobile support; a pickup conveyer frame pivotally connected with said support on a first horizontal transverse axis; a pickup conveyer drive shaft rotatably mounted on said frame forwardly of said first axis; an auxiliary conveyer drive shaft operatively mounted on said frame for rotation on a second horizontal transverse axis above said pickup conveyer drive shaft; an auxiliary conveyer frame pivotally connected at its rearward end with said pickup conveyer frame on said second axis and having a forward end in overlying relation to the forward end of said pickup conveyer frame; adjustable suspension means mounted on said support and operatively connected with said pickup conveyer frame for raising and lowering said pickup conveyer frame about said first axis, an elongated load transmitting structure pivotally connected at longitudinally spaced portions thereof, respectively, with said support and with said auxiliary conveyer frame for lowering and raising said auxiliary conveyer frame about said second axis in response to raising and lowering movements, respectively, of said pickup conveyer frame; a first endless belt type conveying element operatively connected with said pickup conveyer drive shaft and presenting an upper stretch in underlying relation to said auxiliary conveyer frame; a second endless belt type conveying element operatively connected with said auxiliary conveyer drive shaft and presenting a lower stretch in overlying relation to said pickup conveyer frame; and drive means operable to simultaneously rotate said pickup conveyer and auxiliary conveyer drive shafts so as to move said upper and lower stretches of said first and second conveying elements, respectively, in a rearward direction.

4. A crop handling machine comprising, in combination, a mobile support; a pickup conveyer frame pivotally connected with said support on a first horizontal transverse axis, a pickup conveyer drive shaft rotatably mounted on said frame forwardly of said first axis; an auxiliary conveyer drive shaft operatively mounted on said frame for rotation on a second horizontal transverse axis above said pickup conveyer drive shaft; an auxiliary conveyer frame pivotally connected at its rearward end with said pickup conveyer frame on said second axis and having a forward end in overlying relation to the forward end of said pickup conveyer frame; adjustable suspension means mounted on said support and operatively connected with said pickup conveyer frame for securing the latter in different positions of pivotal adjustment about said first axis; a hanger element of predetermined length pivotally connected at one end thereof to a portion of said support above said first axis; pivot means connecting the other end of said hanger element with said auxiliary conveyer frame at a predetermined spacing from said second axis so that movement of said second axis by pivotal up and down adjustment of said pickup conveyer frame about said pivot axis will cause downward and upward swinging movements, respectively, of said forward end of said auxiliary conveyer frame about said second axis; a first endless belt type conveying element operatively connected with said pickup conveyer drive shaft and presenting an upper stretch in underlying relation to said auxiliary conveyer frame; a second endless belt type conveying element operatively connected with said auxiliary conveyer drive shaft and presenting a lower stretch in overlying relation to said pickup conveyer frame; and drive means operable to simultaneously rotate said pickup conveyer and auxiliary conveyer drive shafts so as to move said upper and lower stretches of said first and second conveying elements, respectively, in a rearward direction.

References Cited in the file of this patent
UNITED STATES PATENTS

| | | |
|---|---|---|
| 199,805 | Dean | Jan. 29, 1878 |
| 1,553,584 | Anderson | Sept. 15, 1925 |
| 2,402,849 | Sensenig | June 25, 1946 |
| 2,561,754 | Propheter | July 24, 1951 |
| 2,581,542 | Kolzing | Jan. 8, 1952 |
| 2,699,031 | MacDonald | Jan. 11, 1955 |
| 2,729,049 | Porter | Jan. 3, 1956 |
| 2,795,100 | Sund | June 11, 1957 |

UNITED STATES PATENT OFFICE
CERTIFICATE OF CORRECTION

Patent No. 3,016,675 January 16, 1962

Paul H. Harrer et al.

It is hereby certified that error appears in the above numbered patent requiring correction and that the said Letters Patent should read as corrected below.

Column 8, line 37, for "pivot" read -- first --.

Signed and sealed this 8th day of May 1962.

(SEAL)
Attest:

ERNEST W. SWIDER
Attesting Officer

DAVID L. LADD
Commissioner of Patents